Feb. 10, 1959  V. E. KIRKPATRICK  2,872,967
WALKING-AID APPARATUS
Filed Nov. 13, 1956
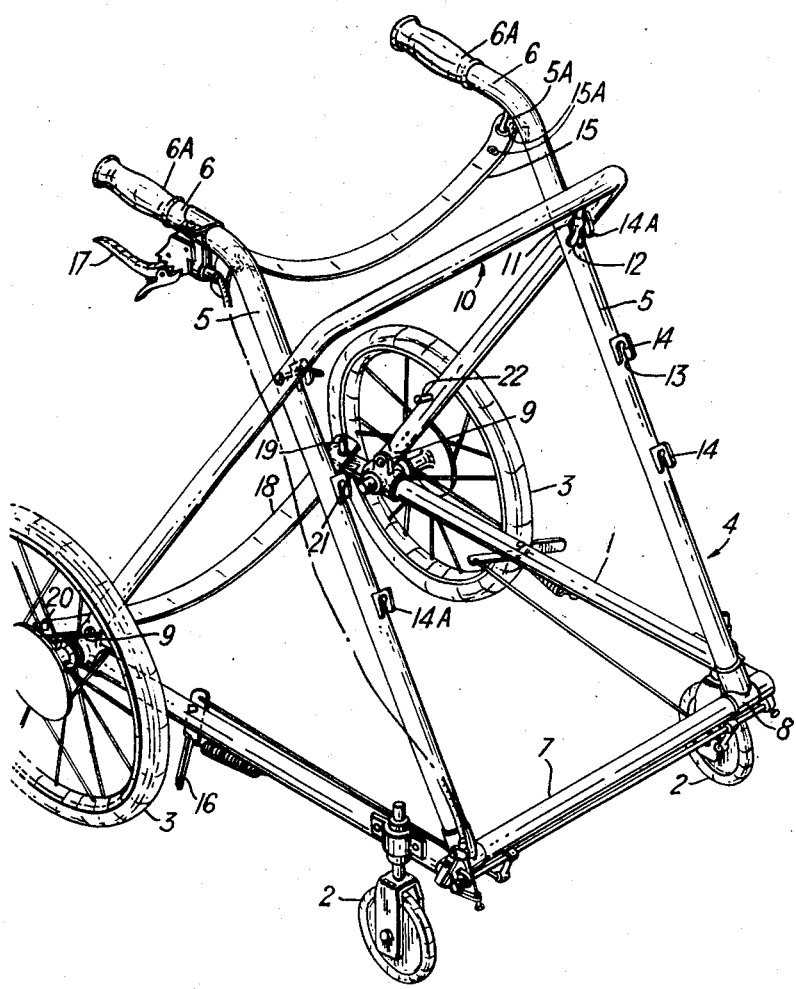
Inventor:
VIDA ELIZABETH KIRKPATRICK
By
Richardson, David and Nordon
Attorneys

2,872,967

WALKING-AID APPARATUS

Vida E. Kirkpatrick, Ballymoney, Northern Ireland

Application November 13, 1956, Serial No. 621,849

4 Claims. (Cl. 155—22)

This invention relates to walking-aid apparatus.

According to the present invention I provide walking-aid apparatus comprising laterally interspaced handles mounted on a wheeled base which is open at the end below said handles, the apparatus being collapsible from an in-use position to a substantially flat out-of-use position.

An embodiment of the invention will now be described, by way of example, with reference to the accompanying drawing which shows a perspective view of the apparatus.

Referring to the drawing, the apparatus consists of two horizontal and interspaced base members 1 mounted on four wheels of which the front wheels 2 are small and pivotal and the rear wheels 3 are relatively large, the wheels being located to the outside of the base members 1. To the front of the base members 1 there is pivotally attached the closed end of a U-shaped frame generally indicated at 4 which in the in-use position shown extends upwards and is inclined rearwards and its side members 5 present at their upper ends two laterally interspaced horizontal handles 6 which lie within the wheel base. The frame 4 is pivotally attached to the base members 1 by the ends of its cross member 7 which project beyond the side members 5 and engage in sockets 8 projecting inwardly from the base members 1. To the rear of the base members 1 there is pivotally attached at 9 the open end of a third U-shaped frame generally indicated at 10 which in its in-use position shown extends upwards and is inclined forwards and lies outside the said frame 4.

The frames 4 and 10 are releasably interlocked in the above described position in any convenient manner, as by bolts 11 with wing nuts 12 provided on the frame 10 to fit into slots 13 open at their lower ends and formed in lugs 14 on the side members 5.

When the wing nuts 12 are loosened, the frames 4 and 10 can be swung down on top of the base members 1 so that in its collapsed out-of-use position, the apparatus is substantially flat and easily carried or stored and can fit, for example, into the luggage boot of a motor car.

It will be understood that the person using the apparatus supports or partly supports himself or herself on the handles 6 and the feet and legs are free to move by virtue of the base members 1 being open below the handles 6.

A strap 15 having eyelets 15A is slung between hooks 5A on the handles 6 and the person can turn around and rest fully or partially seated on the strap 15, or can, if necessary be wheeled, so supported, by another person. For this purpose, the closed end of the frame 10 projects forwardly beyond the frame 4 so as to provide a hand-rail for the person pushing the apparatus.

A brake 16 is preferably provided and operates on at least one of the rear wheels 3 and has its operating lever 17 on one of the handles 6. The frames 4 and 10 and base members 1 are preferably made from tubular steel, and the handles may be made height and position adjustable in any convenient manner, as by the provision of additional lugs 14A.

Various modifications may be made without departing from the scope of the invention. For example, the base may be a U-shaped frame and the frames 4 and 10 be replaced by side members, and the height adjustment of the handles 6 may alternatively be effected by making the side members 5 telescopic or by cranking the handles 6 and making them rotatably adjustable relative to the members 5.

The handles are provided with handgrips 6A, and a foot rest is preferably provided so that when the user is being wheeled in the seated position the user may support the feet thereon. The foot rest shown is in the form of a leather strap 18 having an eyelet at each end which fits over spuds 19, 20 provided on extensions 21 formed on the members 1. Another spud 22 is provided on a side member of the frame 10, and, when the strap 18 is not required as a foot rest, one of its ends is detached from the spud 19 and is then attached to the spud 22 and the strap lies in an out-of-use position. The slots in the lugs 14 and 14A preferably open at their upper ends into a notch as shown, so that when the frames are erected from their collapsed position, the bolts 11 rest in the notches and the frames are held in position until the wing nuts 12 are tightened. Instead of a plurality of lugs 14, 14A being provided on each member 5, one slidably adjustable lug may be provided on each member 5.

The invention is especially intended to be used by persons who have lost the full power of their legs through a form of paralysis, but can of course be used by persons otherwise crippled. The apparatus can be easily and cheaply manufactured, and can be quickly and simply erected or collapsed as required, and has great advantages over hitherto known or proposed walking-aids that it is both wheeled and collapsible, it requires no manipulation apart from guiding, it is stable by virtue of its four wheels, and it can also be used as a body rest, and to wheel the disabled person when necessary.

I claim:

1. Walking-aid apparatus comprising laterally interspaced handles, a wheeled base open at the end below said handles and comprising two horizontal and interspaced members, a first substantially U-shaped frame, the closed end of which is attached to the front end of said base members and which at its open end presents said handles and is pivotal between an upwardly and rearwardly inclined in-use position and a collapsed position in which it lies substantially parallel with said base members, a second substantially U-shaped frame of which the open end is attached to the rear end of said base members and lies outside the first frame, said second frame being pivotal between an upwardly and forwardly inclined in-use position and a position in which it lies substantially parallel with said base members, and means for releasably interlocking said first and second frames at various inclinations so that the height of the handles may be varied.

2. Walking-aid apparatus comprising laterally interspaced handles, a strap slung between said handles for use as a seat rest, a wheeled base open at the end below said handles and comprising two horizontal and interspaced members, a first substantially U-shaped frame, the closed end of which is attached to the front end of said base members and which at its open end presents said handles and is pivotal between an upwardly and rearwardly inclined in-use position and a collapsed position in which it lies substantially parallel with said base members, a second substantially U-shaped frame of which the open end is attached to the rear end of said base members and lies outside the first frame, said second frame being pivotal between an upwardly and forwardly inclined in-use position and a position in which it lies substantially parallel with said base members, and means for releasably interlocking said first and second frames at various inclinations so that the height of the handles may be varied.

3. Walking-aid apparatus comprising laterally interspaced handles, a strap slung between said handles for use as a seat rest, a base mounted on two small and pivotal front wheels and two relatively large rear wheels and open at the end below said handles and comprising two horizontal and interspaced members, a first substantially U-shaped frame, the closed end of which is attached to the front end of said base members and which at its open end presents said handles and is pivotal between an upwardly and rearwardly inclined in-use position and a collapsed position in which it lies substantially parallel with said base members, a second substantially U-shaped frame of which the open end is attached to the rear end of said base members and lies outside the first frame, said second frame being pivotal between an upwardly and forwardly inclined in-use position and a position in which it lies substantially parallel with said base members, and means for releasably interlocking said first and second frames at various inclinations so that the height of the handles may be varied.

4. Walking-aid apparatus comprising laterally interspaced handles, a strap slung between said handles for use as a seat rest, a base mounted on two small and pivotal front wheels and two relatively large rear wheels and open at the end below said handles and comprising two horizontal and interspaced members, a foot rest member extending in its in-use position across the open end of the base and movable to an out-of-use position, a first substantially U-shaped frame, the closed end of which is attached to the front end of said base members and which at its open end presents said handles and is pivotal between an upwardly and rearwardly inclined in-use position and a collapsed position in which it lies substantially parallel with said base members, a second substantially U-shaped frame of which the open end is attached to the rear end of said base members and lies outside the first frame, said second frame being pivotal between an upwardly and forwardly inclined in-use position and a position in which it lies substantially parallel with said base members, and means for releasably interlocking said first and second frames at various inclinations so that the height of the handles may be varied.

References Cited in the file of this patent

UNITED STATES PATENTS

| | | |
|---|---|---|
| 86,699 | Schopp | Feb. 9, 1869 |
| 1,349,674 | Jenkins | Aug. 17, 1920 |
| 2,339,007 | Gahm | Jan. 11, 1944 |
| 2,422,862 | Stottrup | June 24, 1947 |
| 2,616,718 | Heideman | Nov. 4, 1952 |

FOREIGN PATENTS

| | | |
|---|---|---|
| 81,254 | Denmark | June 18, 1956 |